United States Patent
Zhang et al.

(10) Patent No.: US 11,976,188 B2
(45) Date of Patent: May 7, 2024

(54) POLYMER COMPOSITIONS WITH HIGH COLOR PIGMENTS LOADING

(71) Applicant: ExxonMobil Chemical Patents Inc., Baytown, TX (US)

(72) Inventors: Shanshan Zhang, Houston, TX (US); Wenbin Yu, Stockholm (SE); Thomas Cugnon, Perwez (BE); Saurabh C. Sharma, Karnataka (IN); Gan-Ji Zhong, Chengdu (CN)

(73) Assignee: ExxonMobil Engineering & Technology Company, Baytown, TX (US)

( * ) Notice: Subject to any disclaimer, the term of this patent is extended or adjusted under 35 U.S.C. 154(b) by 467 days.

(21) Appl. No.: 16/682,087

(22) Filed: Nov. 13, 2019

(65) Prior Publication Data
US 2020/0181380 A1 Jun. 11, 2020

Related U.S. Application Data

(60) Provisional application No. 62/778,123, filed on Dec. 11, 2018.

(51) Int. Cl.
*C08K 3/013* (2018.01)
*C08K 5/14* (2006.01)
*C08K 5/3492* (2006.01)
*C08L 23/08* (2006.01)
*C08L 23/14* (2006.01)
*C09B 47/04* (2006.01)

(52) U.S. Cl.
CPC .............. *C08L 23/14* (2013.01); *C08K 3/013* (2018.01); *C08K 5/14* (2013.01); *C08K 5/34924* (2013.01); *C08L 23/0815* (2013.01); *C09B 47/04* (2013.01); *C08L 2203/30* (2013.01); *C08L 2205/02* (2013.01); *C08L 2310/00* (2013.01); *C08L 2312/00* (2013.01)

(58) Field of Classification Search
CPC ....... C08K 5/16; C08K 5/34924; C08F 10/06; C08F 210/06; C08F 10/02; C08F 210/02; C08L 23/14; C08L 23/142; C08L 23/145; C08L 23/08; C08L 23/0807; C08L 23/0815
See application file for complete search history.

(56) References Cited

U.S. PATENT DOCUMENTS

| | | | |
|---|---|---|---|
| 3,360,497 A * | 12/1967 | Jones | C08J 3/215 524/106 |
| 7,335,696 B2 | 2/2008 | Yalvac et al. | |
| 7,737,206 B2 | 6/2010 | Ouhadi | |
| 2015/0038637 A1 * | 2/2015 | Tong | C08L 23/14 524/528 |
| 2015/0166850 A1 * | 6/2015 | Tse | C09J 123/14 524/528 |

OTHER PUBLICATIONS

Maqier, C et al. Polypropylene—The Definitive User's Guide and Databook William Andrew Publishing/Plastics Design Library pp. 39-43 (Year: 1998).*

* cited by examiner

*Primary Examiner* — Marc S Zimmer
*Assistant Examiner* — Jeffrey S Lenihan

(57) ABSTRACT

This disclosure relates to a polymer composition with color pigments highly incorporated, comprising (a) propylene-based copolymers and/or ethylene/$C_3$-$C_{10}$ alpha-olefin copolymers and (b) one or more color pigments.

12 Claims, 4 Drawing Sheets

POLYMER COMPOSITIONS WITH HIGH COLOR PIGMENTS LOADING

CROSS-REFERENCE TO RELATED APPLICATIONS

This application claims priority to U.S. Ser. No. 62/778,123, filed Dec. 11, 2018, herein incorporated by reference.

FIELD OF THE INVENTION

The present invention relates to polymer compositions and, in particular to polymer compositions with color pigments highly incorporated, comprising (a) propylene-based copolymers and/or ethylene/$C_3$-$C_{10}$ alpha-olefin copolymers and (b) one or more color pigments.

BACKGROUND OF THE INVENTION

Highly filled polymer compositions are used extensively in commercial applications, such as flame retardant (FR) and halogen-free flame retardant (HFFR) applications; sound management applications; flooring applications; wire and cable applications; roofing membrane applications; wall covering applications; magnetic sheet/strip applications; carpet backing; containers and automotive applications. Likewise, such highly filled polymer compositions can be used as master batch with filler highly loaded.

High melt flow rate polyolefins, such as polypropylene and polyethylene homo- and copolymers, are used in this field with the limitation of low levels of color pigments incorporated, poor processability, and poor mechanical properties. The homogeneity of such very high melt flow rate polyolefins incorporated with high amount of color pigments is generally low.

U.S. Pat. No. 7,737,206 discloses a composition consisting essentially of a propylene copolymer, a filler, a homopolypropylene and a synthetic or natural rubber. U.S. Pat. No. 7,335,696 discloses a composition comprising ethylene/alpha-olefin copolymer and fillers loaded in an amount of greater than 40 percent by weight of the polymer composition.

However, there is a need for a novel polymer composition suitable for the fabrication of finished articles and/or as a color pigment masterbatch. It would be desirable to utilize very high levels of color pigment for these applications, typically at least 5 wt %, preferably at least 20 wt %, more preferably at least 30 wt %, even more preferably at least 40 wt %, and if achievable, at least 50 wt % and up to 60 wt % filler, while still maintaining the balance of performance properties, such as flexibility, tensile strength, impact strength, extensibility, elongation, heat resistance, low temperature flexibility, thermoformability and thermostability during processing, and excellent dispersion performance of color pigments incorporated therein, necessary to effectively fabricate the filled polymer compositions into fabricated articles.

What is desired is a polymer composition that is capable of incorporating large quantities of color pigments with good dispersion of color pigments incorporated while simultaneously exhibiting an enhanced balance of physical and mechanical properties for the applications of interest.

SUMMARY OF THE INVENTION

In some embodiments, this disclosure relates to a polymer composition comprising: an olefin-based copolymer, and a color pigment comprising at least one phthalocyanine compound, or halide derivatives thereof:

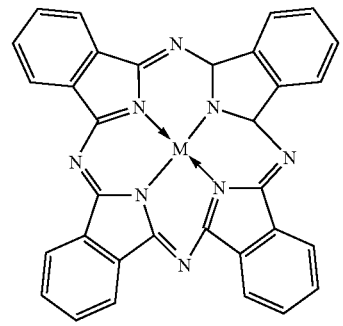

wherein M is a metal selected from the group consisting of copper, nickel, cobalt, chromium, iron, manganese, cadmium and combinations thereof; and wherein the olefin-based copolymer comprises at least one of: (i) a propylene-based copolymer comprising, based on the total weight of the propylene-based copolymer, (a) at least about 60 wt % of propylene-derived units, (b) about 5 wt % to about 35 wt % of units derived from at least one of ethylene-derived units or a $C_4$-$C_{10}$ alpha-olefin-derived units, and optionally (c) about 0 to 5 wt % of diene-derived units, wherein the propylene-based copolymer has a heat of fusion, as determined by DSC, of about 75 J/g or less, a melting point, as determined by DSC, of about 100° C. or less, and a crystallinity, as determined by DSC, of about 2% to about 65%, and a melt flow rate from 0.5 to 1,000 g/10 min measured at 230° C. and 2.16 kg weight (ASTM 1238), and (ii) an ethylene-based copolymer comprising ethylene-derived units and $C_3$-$C_{10}$ alpha-olefin derived units having a total crystallinity, as determined by DSC, of from 2% to 25% and a Brookfield viscosity from 500 to 35,000 cP as measured at 177° C.

In other embodiments, this disclosure relates to a method for making the above polymer compositions and articles comprising the polymer compositions.

DETAILED DESCRIPTION OF THE INVENTION

Figure 1:
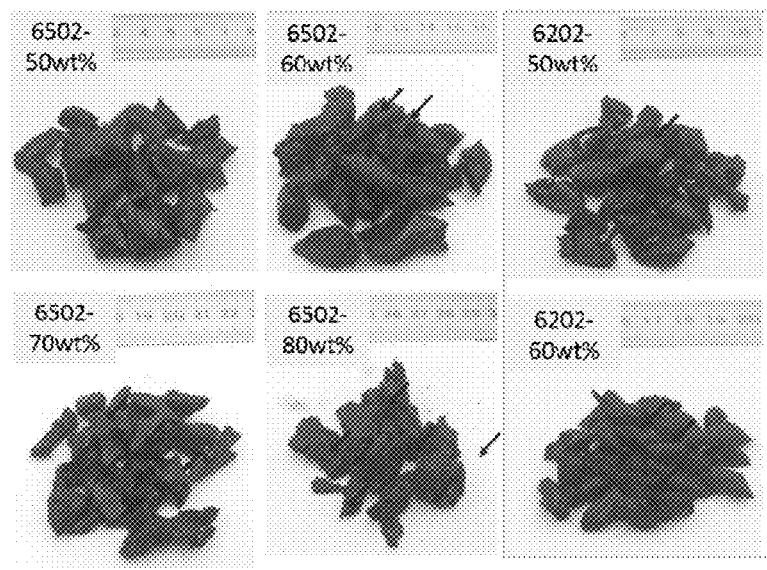
FIG. 1 shows photographs of inventive polymer compositions after melt blending.

Various specific embodiments, versions of the invention will now be described, including preferred embodiments and definitions that are adopted herein. While the following detailed description gives specific preferred embodiments, those skilled in the art will appreciate that these embodiments are exemplary only, and that the invention can be practiced in other ways.

This disclosure relates to a polymer composition comprising an olefin-based copolymer, and a color pigment comprising at least one phthalocyanine compound or halide derivatives thereof. The amount of the olefin-based copolymer in the polymer composition varies from the end-use applications and the desired end-properties of the polymer composition. In some embodiments, the amount of the olefin-based copolymer in the polymer composition of this disclosure is greater than about 40 wt %, greater than 45 wt %, greater than 50 wt %, greater than 55 wt %, based on the total weight of the polymer composition. In other embodiments, the amount of the olefin-based copolymer in the polymer composition of this disclosure is less than about 95 wt %, less than 90 wt %, less than 80 wt %, less than about 70 wt %, or less than 60 wt %, by the total weight of the polymer composition.

The amount of color pigment in the polymer composition varies from the type of the color pigments and the desired end-use applications of the polymer composition. In some embodiments, the amount of the color pigments incorporated into the polymer composition is less than about 60 wt %, less than 55 wt %, or less than 50 wt %, or less than 40 wt %, by the total weight of the polymer composition. In other embodiments, the minimum amount of the color pigment is greater than about 5 wt %, preferably greater than about 10 wt %, more preferably greater than about 20 wt %, even more preferably greater than 30 wt %, and most preferably greater than about 35 wt %, by the total weight of the polymer composition. The polymer composition of this disclosure provides higher loading and better dispersion performance of color pigments, particularly phthalocyanine compounds, incorporated.

Olefin-Based Copolymers

The olefin-based copolymer in this disclosure comprises at least one propylene-based copolymer or at least one ethylene/$C_3$-$C_{10}$ alpha-olefin copolymer as described herein.

Propylene-Based Copolymers

In one embodiment, the olefin-based copolymer is a propylene-based copolymer which is a random copolymer having crystalline regions interrupted by non-crystalline regions. Not intended to be limited by any theory, it is believed that the non-crystalline regions may result from regions of non-crystallizable polypropylene segments and/or the inclusion of comonomer units. The crystallinity and the melting point of the propylene-based elastomer are reduced compared to highly isotactic polypropylene by the introduction of errors (stereo and region defects) in the insertion of propylene and/or by the presence of comonomer. The propylene-based copolymer comprises propylene-derived units and units derived from at least one of ethylene or a $C_4$-$C_{10}$ alpha-olefin, and optionally a diene-derived unit. The copolymer contains at least about 60 wt % propylene-derived units by weight of the propylene-based copolymer. In some embodiments, the propylene-based copolymer is a propylene-based elastomer having limited crystallinity due to adjacent isotactic propylene units and a melting point as described herein. In other embodiments, the propylene-based copolymer is generally devoid of any substantial intermolecular heterogeneity in tacticity and comonomer composition, and also generally devoid of any substantial heterogeneity in intramolecular composition distribution.

The propylene-based copolymer contains greater than about 50 wt %, preferably greater than about 60 wt %, more preferably greater than about 65 wt %, even more preferably greater than about 75 wt % and up to about 99 wt % propylene-derived units, based on the total weight of the propylene-based copolymer. In some preferable embodiments, the propylene-based copolymer includes propylene-derived units in an amount based on the weight of propylene-based copolymer of from about 75 wt % to about 95 wt %, more preferably about 75 wt % to about 92.5 wt %, and even more preferably about 82.5 wt % to about 92.5 wt %, and most preferably about 82.5 wt % to about 90 wt %. Correspondingly, the units, or comonomers, derived from at least one of ethylene-derived units or $C_4$-$C_{10}$ alpha-olefin-derived units may be present in an amount of about 1 wt % to about 35 wt %, or preferably about 5 wt % to about 35 wt %, more preferably about 5 wt % to about 25 wt %, even more preferably about 7.5 wt % to about 25 wt %, even more preferably about 7.5 wt % to about 20 wt %, even more preferably from about 8 wt % to about 17.5 wt %, and most preferably about 10 wt % to 17.5 wt %, based on the total weight of the propylene-based copolymer.

The comonomer content may be adjusted so that the propylene-based copolymer has a heat of fusion of about 75 J/g or less, a melting point of about 100° C. or less, and a crystallinity of about 2% to about 65%, and preferably a melt flow rate ("MFR"), as measured at 230° C. and 2.16 kg weight (ASTM 1238), of 1000 g/10 min or less, alternately from 0.5 to 1,000 g/10 min, alternately of less than 800 g/10 min.

The propylene-based copolymer may comprise more than one comonomer. Preferred embodiments of a propylene-based copolymer have more than one comonomer include propylene-ethylene-octene, propylene-ethylene-hexene, and propylene-ethylene-butene copolymers.

In some embodiments where more than one comonomers derived from at least one of ethylene or a $C_4$-$C_{10}$ alpha-olefin are present, the amount of each comonomer may be less than about 5 wt % of the propylene-based copolymer, but the combined amount of comonomers by weight of the propylene-based copolymer is about 5 wt % or greater.

In preferred embodiments, the comonomer is ethylene, 1-hexene, or 1-octene, and preferably in an amount of about 5 wt % to about 25 wt %, about 5 wt % to about 20 wt %, about 5 wt % to about 16 wt %, about 6 wt % to about 18 wt %, or in some embodiments about 8 wt % to about 20 wt % based on the weight of the propylene-based copolymer.

In one embodiment, the propylene-based copolymer comprises ethylene-derived units. The propylene-based copolymer may comprise about 5 wt % to about 35 wt %, preferably about 5 wt % to about 25 wt %, about 7.5 wt % to about 20 wt %, or about 10 wt % to about 17.5 wt %, of ethylene-derived units by weight of the propylene-based copolymer. In some embodiments, the propylene-based copolymer consists essentially of units derived from propylene and ethylene, i.e., the propylene-based copolymer does not contain any other comonomer in an amount typically present as impurities in the ethylene and/or propylene feedstreams used during polymerization or an amount that would materially affect the heat of fusion, melting point, crystallinity, or melt flow rate of the propylene-based copolymer, or any other comonomer intentionally added to the polymerization process.

In some embodiments, diene comonomer units are included in the propylene-based copolymer. Examples of the diene include, but not limited to, 5-ethylidene-2-norbornene, 5-vinyl-2-norbornene, divinyl benzene, 1, 4-hexadiene, 5-methylene-2-norbornene, 1, 6-octadiene, 5-methyl-1, 4-hexadiene, 3, 7-dimethyl-1, 6-octadiene, 1, 3-cyclopentadiene, 1, 4-cyclohexadiene, dicyclopentadiene, or a combination thereof. The amount of diene comonomer is equal to or more than 0 wt %, or 0.5 wt %, or 1 wt %, or 1.5 wt % and lower than, or equal to, 5 wt %, or 4 wt %, or 3 wt % or 2 wt % based on the weight of propylene-based copolymer.

The propylene-based copolymer has a heat of fusion ("$H_f$"), as determined by the Differential Scanning Calorimetry ("DSC"), of about 75 J/g or less, about 70 J/g or less, about 50 J/g or less, or about 35 J/g or less. The propylene-based copolymer may have a lower limit $H_f$ of about 0.5 J/g, about 1 J/g, or about 5 J/g. For example, the $H_f$ value may be anywhere from 1.0, 1.5, 3.0, 4.0, 6.0, or 7.0 J/g, to 30, 35, 40, 50, 60, 70, or 75 J/g.

The propylene-based copolymer may have a percent crystallinity, as determined according to the DSC procedure described herein, of about 2% to about 65%, preferably about 0.5% to about 40%, preferably about 1% to about 30%, and more preferably about 5% to about 35%. The thermal energy for the highest order of propylene (i.e., 100% crystallinity) is estimated at 189 J/g. In some embodiments, the copolymer has a crystallinity in the range of about 0.25% to about 25%, or about 0.5% to about 22%.

In some embodiments, the propylene-based copolymer is stereoregular and preferably has isotactic stereoregular propylene crystallinity. The term "stereoregular" as used herein means that the predominant number, i.e., greater than 50%, of the propylene residues in the polypropylene exclusive of any other monomer (such as ethylene), have the same 1,2 insertion and the stereochemical orientation of the pendant methyl groups is the same, either meso or racemic, preferably about 50% to about 99%, more preferably about 65% to about 97% and more preferably about 75% to about 97%, as determined by $^{13}$CNMR.

Preferred propylene-based copolymer useful in this invention have an mm triad tacticity index of three propylene units, as measured by $^{13}$C NMR, of 75% or greater, 80% or greater, 82% or greater, 85% or greater, or 90% or greater. The mm triad tacticity index of a polymer is the relative tacticity of a sequence of three adjacent propylene units, a chain consisting of head to tail bonds, expressed as a binary combination of m and r sequences. It is usually expressed for the propylene-based copolymers of the present invention as the ratio of the number of units of the specified tacticity to all of the propylene triads in the copolymer. The mm triad tacticity index (mm fraction) of a propylene copolymer can be determined from a $^{13}$C NMR spectrum of the propylene copolymer and the following formula:

$$mm\ \text{Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

PPP(mm):

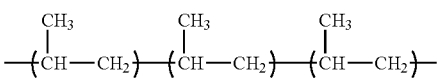

PPP(mr):

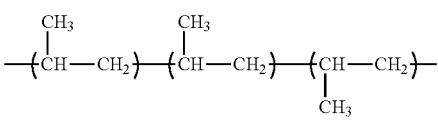

PPP(rr):

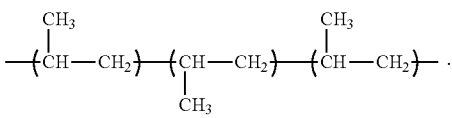

The $^{13}$C NMR spectrum of the propylene-based copolymer is measured as described in U.S. Pat. Nos. 5,504,172 and 6,642,316 (column 6, line 38 to column 9, line 18), including that samples are dissolved in $d_2$-1,1,2,2-tetrachloroethane, and spectra recorded at 125° C. using a 100 MHz (or higher) NMR spectrometer. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30 (1989), page 1350 or an article in the journal *Macromolecules*, 17, (1984), 1950 (In the event of a conflict between the Polymer article and the Macromolecules article, the Polymer article shall control). In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP(rr) resonates, and the methyl group (EPE-methyl group) of a propylene unit whose adjacent units are ethylene units resonates (in the vicinity of 19.8 ppm). The calculation of the mm triad tacticity index is outlined in the techniques shown in U.S. Pat. No. 5,504,172 (homopolymer: column 25, line 49 to column 27, line 26; copolymer: column 28, line 38 to column 29, line 67). Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP (mm), PPP(mr) and PPP(rr) can be evaluated, and hence the mm triad tacticity index of the propylene unit chain consisting of head-to-tail bonds can be determined. For further information on how the mm triad tacticity can be determined from a 13C-NMR spectrum of the polymer, as described by J. A. Ewen, "*Catalytic Polymerization of Olefins*", (the Ewen method); and Eds. T. Keii, K. Soga; Kodanska Elsevier Pub.; Tokyo, 1986, P 271, and as described in detail in U.S. Patent Application US2004/054086 filed Mar. 18, 2004 on page 8, in numbered paragraphs [0046] to [0054], all of which are incorporated by reference herein. The propylene-based copolymer may have a single peak melting transition as determined by DSC. In one embodiment, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the Tm of the propylene-based copolymer. The propylene-based copolymer may have a Tm of about 100° C. or less, about 90° C. or less, about 80° C. or less, or about 70° C. or less. In one embodiment, the propylene-based copolymer has a Tm of about 25° C. to about 100° C., about 25° C. to about 85° C., about 25° C. to about 75° C., or about 25° C. to about 65° C. In some embodiments, the propylene-based copolymer has a Tm of about 30° C. to about 80° C., preferably about 30° C. to 70° C.

Differential scanning calorimetric ("DSC") data of the present invention is obtained using a Perkin-Elmer DSC 7. About 5 mg to about 10 mg of a sheet of the polymer to be tested is pressed at approximately 200° C. to 230° C., then removed with a punch die and annealed at room temperature for 48 hours. The samples are then sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are obtained from the Polymer Handbook, Fourth Edition, published by John Wiley and Sons, New York 1999, except that a value of 189 J/g (B) is used as the heat of fusion for 100% crystalline isotactic polypropylene and a value of 290 J/g (B) is used for 100% crystalline homopolyethylene. The melting temperature is measured and reported during the second heating cycle (or second melt).

In one or more embodiments, the propylene-based elastomer may have a Mooney viscosity [ML (1+4) @ 125° C.], as determined according to ASTM D-1646, of less than 100, in other embodiments less than 75, in other embodiments less than 60, and in other embodiments less than 30.

The propylene-based copolymer may have a density of about 0.850 g/cm$^3$ to about 0.920 g/cm$^3$, about 0.860 g/cm$^3$ to about 0.900 g/cm$^3$, preferably about 0.860 g/cm$^3$ to about 0.890 g/cm$^3$, at room temperature as measured per ASTM D-1505.

The propylene-based copolymer preferably has a melt flow rate ("MFR") greater than 0.5 g/10 min, and less than or equal to about 1,000 g/10 min, or less than or equal to about 800 g/10 min, more preferably less than or equal to about 500 g/10 min, more preferably less than or equal to 200 g/10 min, more preferably less than or equal to about 100 g/10 min, more preferably less than or equal to about 50 g/10 min. Particularly preferred embodiments include a propylene-based copolymer with an MFR of less than or equal to about 25 g/10 min, such as from about 1 to about 25 g/10 min, more preferably about 1 to about 20 g/10 min. The MFR is determined according to ASTM D-1238, condition L (2.16 kg, 230° C.).

The propylene-based copolymer may have a weight average molecular weight ("Mw") of about 5,000 to about 5,000,000 g/mole, preferably about 10,000 to about 1,000,000 g/mole, and more preferably about 50,000 to about 400,000 g/mole; a number average molecular weight ("Mn") of about 2,500 to about 2,500,000 g/mole, preferably about 10,000 to about 250,000 g/mole, and more preferably about 25,000 to about 200,000 g/mole; and/or a z-average molecular weight ("Mz") of about 10,000 to about 7,000,000 g/mole, preferably about 80,000 to about 700,000 g/mole, and more preferably about 100,000 to about 500,000 g/mole. The propylene-based copolymer may have a molecular weight distribution ("MWD") of about 1.5 to about 20, or about 1.5 to about 15, preferably about 1.5 to about 5, and more preferably about 1.8 to about 5, and most preferably about 1.8 to about 4.

The propylene-based copolymer may have an Elongation at Break of less than about 2000%, less than about 1000%, or less than about 800%, as measured per ASTM D412.

This disclosure is not limited by any particular polymerization method for preparing the propylene-based copolymer.

General process conditions may be found in U.S. Pat. No. 5,001,205, PCT publications WO 96/33227 and WO 97/22639, entire content U.S. Pat. Nos. 4,543,399; 4,588, 790; 5,028,670; 5,317,036; 5,352,749; 5,405,922; 5,436, 304; 5,453,471; 5,462,999; 5,616,661; 5,627,242; 5,665, 818; 5,668,228; 5,677,375; and European publications EP-A-0 794 200; EP-A-0 802 202; and EP-B-634 421, the entire contents of which are incorporated herein by reference.

Ethylene/$C_3$-$C_{10}$ Alpha-Olefin Copolymers

In one embodiment, the olefin-based copolymer is an ethylene/$C_3$-$C_{10}$ alpha-olefin copolymer, having ethylene-derived units and $C_3$-$C_{10}$-derived units. The $C_3$-$C_{10}$ alpha-olefin is preferably at least one of propylene, isobutylene, 1-butene, 1-pentene, 1-hexene, 3-methyl-1-pentene, 4-methyl-1-pentene, 1-hexene, and 1-octene. More preferably the $C_3$-$C_{10}$ alpha-olefin is at least one of propylene, isobutylene, 1-butene, 1-pentene, 1-hexene, and 1-octene. Most preferably the $C_3$-$C_{10}$ alpha-olefin is propylene.

In some embodiments, the amount of ethylene-derived unit in the ethylene/$C_3$-$C_{10}$ alpha-olefin copolymer is not limited to any specific ranges as long as the ethylene/$C_3$-$C_{10}$ alpha-olefin copolymer has a low viscosity (e.g., 35,000 cP or less at 177° C.) and a low crystallinity (e.g., percent crystallinity of 25% or less).

The density of the ethylene/$C_3$-$C_{10}$ alpha-olefin copolymer of the present disclosure preferably ranges from about 0.865 g/cm$^3$ to about 0.885 g/cm$^3$ as measured in accordance with ASTM D-1505.

The melting point of the ethylene/$C_3$-$C_{10}$ alpha-olefin copolymer is preferably less than 65° C., and more preferably less than 60° C., as measured by DSC.

The Brookfield viscosity is determined in accordance with the following procedure. A Brookfield Laboratories DVII+ Viscometer is used with disposable aluminum sample chambers. The spindle used is a SC-31 hot-melt spindle. The sample is poured in the chamber, then inserted into a Brookfield Thermosel and locked with bent needle-nose pliers. The sample chamber has a notch on the bottom to prevent the chamber from turning when the spindle is inserted and spinning. The sample is heated to the required temperature with additional sample being added until the melted sample is about 1 inch below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the reading stabilizes and then the final reading is recorded. The ethylene/$C_3$-$C_{10}$ alpha-olefin copolymer has a low viscosity ranging from 500 to 35,000 cP, alternately 1,000 to 35,000 cP, preferably from 2,000 to 30,000 cP, more preferably from 3,000 to 20,000 cP at 177° C.

The ethylene/$C_3$-$C_{10}$ alpha-olefin copolymer, its preparation methods and catalyst used are disclosed in U.S. Pat. Nos. 5,064,802; 5,132,380; 5,703,187; 6,034,021; 5,044,438; 5,057,475; 5,096,867; 5,324,800; EP 0 468 651; EP 0 514 828; WO 93/19104; and WO 95/00526.

In some embodiments, the olefin-based copolymer may comprise both propylene-based copolymer and ethylene/$C_3$-$C_{10}$ alpha-olefin copolymer.

Preferred examples of olefin-based copolymer are available commercially under the trade names VISTAMAXX™ (ExxonMobil Chemical Company, Houston, TX, USA), VERSIFY™ (The Dow Chemical Company, Midland, Michigan, USA), TAFMER™ XM (Mitsui Chemicals, Inc., Tokyo, Japan), or L-MODU™ (Idemitsu Kosan Co., Ltd., Tokyo, Japan). The particular grade(s) of commercially available propylene-based copolymer or ethylene//$C_3$-$C_{10}$ alpha-olefin copolymer suitable for use in this disclosure can be readily determined using methods commonly known in the art.

Color Pigments

The phthalocyanine compounds which are suitable for use in this disclosure include any of the compounds containing a tetrabenzoporphyrazine nucleus (four benzopyrrole nuclei joined four N-atoms), either metal-free or containing a metal as defined below. Particularly preferred are those phthalocyanine compounds having the formula:

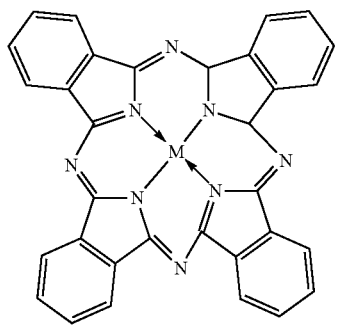

wherein M is a metal capable of forming a chelate structure. In some embodiments, the metal can be selected from a group consisting of copper, nickel, cobalt, chromium, iron, manganese, cadmium and combinations thereof. Preferably, M is either copper or nickel, or a combination thereof. These materials commercially available under the designation of phthalocyanine green and phthalocyanine blue. The phthalocyanine compounds can be incorporated in the polymer compositions by any known manner such as by melt blending, dry blending or solution blending.

The phthalocyanine compounds employed in this disclosure can be used in widely varying amounts, such amounts being sufficient to be effective in obtaining improved results of this disclosure relative to the improvement in a higher loading and better dispersion of the color pigments. Generally, the color pigment, i.e., the phthalocyanine compound, will be employed in amounts such that from about 1 wt % to about 70 wt %, preferably from about 5 wt % to about 60 wt %, based on the total weight of the polymer composition. Mixtures of the various phthalocyanine additives can be used so long as the total concentration of all the phthalocyanine additives does not exceed the stated limits.

It is preferred that the amount of phthalocyanine additive which is incorporated into the inorganic pigmented olefin-based copolymer compositions be held below the tinctorial level to avoid interference with the inorganic pigmentation. In addition, indiscriminate use of the phthalocyanine additives, particularly in amounts above the tinctorial level, can result in warpage and crazing of shaped structures formed therefrom.

The phthalocyanine additives of the invention can be incorporated into the olefin-based copolymer in any conventional manner such as dry blending the powdered additives directly with olefin-based copolymer pellets or fluff by means of tumble mixers, Henschel blenders and the like. Solutions of slurries of the stabilizer of the additives can be sprayed onto or stirred with a granular olefin-based copolymer. Suitable solvents for this purpose include acetone, benzene, cyclohexane, methyl alcohol, and the like. In general, the solvent is evaporated out before the blend is extruded although, alternatively, the solvent-wetted olefin-based copolymer can be processed immediately by means of a devolatilizing extruder. The phthalocyanine additives can also be blended with the molten olefin-based copolymer by means of a Banbury mixer, Brabender mixer, roll mill, screw extruder and the like, if desired.

Fillers

The fillers of this disclosure may be either solid inorganic fillers and/or solid organic fillers. The term "filler" encompasses those organic or inorganic fillers excluding the color pigments as disclosed above. The term "solid" as used herein means that a material is solid at temperatures of up to about 40° C.

Representative organic fillers include such materials as cellulose, starch, organic UV-stabilizers, organic heat-stabilizers, organic flame retardants such as halogenated, flour, wood flour, natural fibers, and polymeric fibers like polyester-based, polyamide-based materials, ammonium octamolybdate and intumescent compounds.

Representative inorganic fillers include talc, graphite, calcium carbonate, glass fibers, marble dust, cement dust, clay, feldspar, silica or glass, fumed silica, alumina, magnesium oxide, antimony oxide, zinc oxide, barium sulfate, silicones calcium sulfate, aluminum silicate, calcium silicate, titanium dioxide, titanates, clay, nanoclay, organomodified clay or nanoclay, glass microspheres, mica, wollastonite, and chalk. Of these fillers, barium sulfate, talc, calcium carbonate, silica/glass, glass fibers, alumina, aluminum trihydroxide, magnesium hydroxide and titanium dioxide, and mixtures thereof are preferred. The most preferred inorganic fillers are talc, magnesium hydroxide, aluminum trihydroxide, calcium carbonate, barium sulfate, glass fibers or mixtures thereof. For flame resistance applications, the preferred flame-retardant fillers include magnesium hydroxide, aluminum trihydroxide (also referred to as alumina trihydrate) and mixtures of two or more of these materials, red amorphous phosphorous, polyphosphates, alkyl phosphates, alkyl phosphonates, amine phosphates, aminoalkyl phosphates, ammonium phosphates, ammonium polyphosphates, antimony oxide, and zinc borates.

Cross-Linking Pack

Optionally, in some embodiments, the polymer composition of this disclosure further comprises a cross-linking pack including a cross-linking agent and a coagent. Not intended to be limited by any theory, it is believed that the addition of cross-linking agents may create cross links between the plastic and rubber phases, which improves the physical properties of the innovated crosslinked polymer composition of this disclosure. Suitable cross-linking agents are organic peroxides including both alkyl and aralkyl peroxides. Examples include, but are not limited to, dicumylperoxide ("DCP"), 2,5-dimethyl-2,5-di(t-butylperoxy)hexane, 1,1-bis(t-butylperoxy)-3,3,5-trimethyl-cyclohexane, 1,1-di-(t-butylperoxy)-cyclohexane, 2,2'-bis(t-butylperoxy) diisopropylbenzene, α, α-bis(tert-butylperoxy) diisopropyl benzene, 4,4'-bis(t-butylperoxy)butylvalerate, t-butylperbenzoate, t-butylperterephthalate, t-butyl peroxide, benzoyl peroxide, cumene hydroperoxide, t-butyl peroctoate, methyl ethyl ketone peroxide, lauryl peroxide, and tert-butyl peracetate. Also, diaryl peroxides, ketone peroxides, peroxydicarbonates, peroxyesters, dialkyl peroxides, hydroperoxides, peroxyketals and mixtures thereof may be used. The amount of organic peroxide is more than, or equal to, 0.1 parts by weight, or 0.5 parts by weight, or 0.8 parts by weight and less than, or equal to, 5 parts by weight, or 4 parts by weight, or 3 parts by weight based on 100 parts by weight of the first polymer.

The addition of the coagent may enhance the effectiveness of the cross-linking. Suitable coagents include di- and tri-allyl cyanurates and isocyanurates, liquid and metallic multifunctional acrylates and methacrylates, zinc-based dimethacrylates and diacrylates, and functionalized polybutadiene resins. The amount of organic peroxide is more than, or equal to, 0.1 parts by weight, 0.5 parts by weight, or 1 parts by weight and less than, or equal to, 10 parts by weight, 8 parts by weight, or 5 parts by weight based on 100 parts by weight of the first polymer.

Other Additives

As will be evident to those skilled in the art, the polymer compositions of the present disclosure may comprise other additives in addition to the olefin-based copolymer and fillers as described above. Various additives may be present to enhance a specific property or may be present as a result of processing of the individual components. Additives which may be incorporated include, but are not limited to processing oils, fire retardants, antioxidants, plasticizers, vulcanizing or curative agents, vulcanizing or curative accelerators, cure retarders, processing aids, tackifying resins, flow improvers, silane coupling agent and the like. Antiblocking agents, coloring agents, lubricants, mold release agents, nucleating agents, reinforcements, and other fillers (including granular, fibrous, or powder-like) may also be employed. Nucleating agents may improve the rigidity of the article. The list described herein is not intended to be inclusive of all types of other additives which may be employed with the present disclosure. Those of skill in the art will appreciate that other additives may be employed to enhance properties of the polymer composition. As is understood by those skilled in the art, the polymer compositions of the present disclosure may be modified to adjust the characteristics of the blend as desired.

The polymer compositions described herein may contain process oil in the range of from 0 to 500 parts by weight, from 2 to 200 parts by weight, from 5 to 150 parts by weight, or from 10 to 100 parts by weight per 100 parts of first polymer. The addition of process oil in moderate amounts may lower the viscosity and flexibility of the blend while improving the properties of the blend at temperatures near and below 0° C. It is believed that these potential benefits arise by the lowering of the glass transition temperature ("Tg") of the blend. Adding process oil to the blend may also improve processability and provide a better balance of elastic and tensile strength. The process oil is typically known as extender oil in rubber applications. Process oils include hydrocarbons having either (a) traces of hetero atoms such oxygen or (b) at least one hetero atom such as dioctyl plithalate, ethers, and polyethers. Process oils have a boiling point to be substantially involatile at 200° C. These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils are certain organic esters and alkyl ether esters having a molecular weight ("Mn") less than 10,000. Combinations of process oils may also be used in the practice of this disclosure. The process oil should be compatible or miscible with the polymer blend composition in the melt, and may be substantially miscible in the propylene-based elastomer at room temperature. Process oils may be added to the blend compositions by any of the conventional means known in the art, including the addition of all or part of the process oil prior to recovery of the polymer, and addition of all or part of the process oil to the polymer as a part of a compounding for the interblending of the propylene-based elastomer. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832, the disclosures of which are hereby incorporated herein by reference.

The addition of process aids, such as a mixture of fatty acid ester or calcium fatty acid soap bound on a mineral filler, to the polymer compositions described herein may help the mixing of the polymer composition and the injection of the polymer composition into a mold. Other examples of process aids are low molecular weight polyethylene copolymer wax and paraffin wax. The amount of process aid used may be within the range of from 0.5 to 5 parts by weight based on the total weight of the polymer composition.

Adding antioxidants to the polymer compositions described herein may improve the long term aging. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 parts by weight based on the total weight of the polymer composition.

Method of Making

The polymer compositions according to this disclosure may be compounded by any convenient method, such as dry blending of the olefin-based copolymer, the color pigments, and optionally the fillers, the cross-linking pack, and other additives, and subsequently melt-mixing at a temperature above the melting temperature of the thermoplastic component, either directly in an extruder used to make the finished article, or by pre-melt mixing in a separate extruder (for example, a Banbury mixer). Dry blends of the polymer compositions can also be directly injection molded without pre-melt mixture. Examples of machinery capable of generating the shear and mixing include extruders with kneaders or mixing elements with one or more mixing tips or flights, extruders with one or more screws, extruders of co- or counter-rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 rpm). Typically the temperature for melt-mixing is from 60° C. to 130° C., and the residence time is from 10 to 20 minutes.

The blend may contain additives, which can be introduced into the polymer composition at the same time as the other components or later at down stream in case of using an extruder or Buss kneader or only later in time. The additives can be added to the blend in pure form or in masterbatches. The process oil or plasticizer can be added in one addition or in multiple additions. Preferably, the plasticizers are added after sufficient molten-state mixing of the polymer component and the optional one or more second polymers. Alternatively, the olefin-based copolymer and the crosslinking pack, if present, may be blended prior to the incorporation of the color pigments. The blend can either be a physical blend or an in-reactor blend manufactured by in-reactor processes as known to those of ordinary skill in the art. The polymer compositions can be processed to fabricate articles by any suitable means known in the art. For example, the polymer compositions can be processed to films or sheets or to one or more layers of a multi-layered structure by known processes, such as calendering, casting or co-extrusion. Injection molded, compression molded, extruded or blow molded parts can also be prepared from the polymer compositions of the present disclosure. Typically the temperature for molding is higher than that for melt-mixing, and is preferably from 60 to 130° C., and the residence time is preferably 3 to 42 minutes. Alternatively, the polymer compositions can be processed by profile extrusion processes to make articles, such as wire and cable, magnetic strip, pipe and tubing, gaskets, molded articles, carpet backing, containers and floorings. The extrudate can also be milled, chopped, granulated or pelletized.

The polymer compositions of this disclosure are also useful in the preparation of masterbatches. For example, the addition of color pigments to a polymer is often through the use of a masterbatch. In this example, the olefin-based copolymer is highly filled with the color pigments and/or fillers to form a masterbatch. The compositions of this disclosure can contain more color pigments than conventional compositions.

Applications

This disclosure encompasses a roofing material, wire and cable insulation or jackets, magnetic strip, carpet backing, container, film, sheet, filament or sound deadening materials, produced using the polymer compositions or thermoplastic blend compositions. Methods of their manufacturing are commonly known in the art and can be found, for example, in U.S. Pat. No. 4,241,123. Non-limiting specific examples will be illustrated in the below.

This disclosure will be described in more detail herein below by reference to the examples. The examples are not to be construed to limit the scope of the invention.

This invention further relates to:

1. A polymer composition comprising: an olefin-based copolymer, and a color pigment comprising at least one phthalocyanine compound having the following formula or halide derivatives thereof:

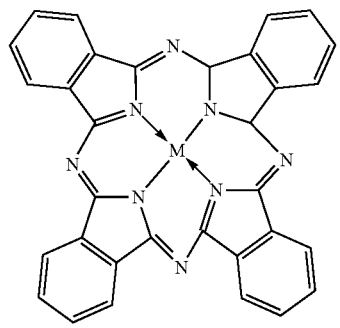

wherein M is a metal selected from the group consisting of copper, nickel, cobalt, chromium, iron, manganese, cadmium and combinations thereof;

wherein the olefin-based copolymer comprises at least one of the following:

(i) a propylene-based copolymer comprising, based on the total weight of the propylene-based copolymer, (a) at least about 60 wt % of propylene-derived units, (b) about 5 wt % to about 35 wt % of units derived from at least one of ethylene or a $C_4$-$C_{10}$ alpha-olefin, and optionally (c) about 0 to 5 wt % of diene-derived units, wherein the propylene-based copolymer has a heat of fusion, as determined by DSC, of about 75 J/g or less, a melting point, as determined by DSC, of about 100° C. or less, and a crystallinity, as determined by DSC, of about 2% to about 65%, and a melt flow rate from 0.5 to 1,000 g/10 min measured at 230° C. and 2.16 kg weight, and (ii) an ethylene/$C_3$-$C_{10}$ alpha-olefin copolymer having a total crystallinity, as determined by DSC, of from 2% to 25% and a Brookfield viscosity from 500 to 35,000 cP measured at 177° C.

2. The polymer composition of paragraph 1, wherein the color pigment is selected from the group consisting of phthalocyanine green, phthalocyanine blue, and combinations thereof.

3. The polymer composition of paragraph 1, wherein M of the formula is a metal selected from the group consisting of copper, nickel, and combinations thereof.

4. The polymer composition of paragraph 1, wherein the color pigment is present in an amount of from 5 wt % to 60 wt %, based on the total weight of the polymer composition.

5. The polymer composition of paragraph 1, wherein the olefin-based copolymer is a propylene-based copolymer.

6. The polymer composition of paragraph 5, wherein the propylene-based copolymer comprises, based on the weight of the propylene-based copolymer, (a) at least about 75 wt % to 95 wt % of propylene-derived units, (b) about 5 wt % to 25 wt % of units derived from at least one of ethylene or a $C_4$-$C_{10}$ alpha-olefin, and optionally (c) about 0 to 4 wt % of diene-derived units, wherein the propylene-based copolymer has an mm triad tacticity index, as determined by $^{13}$C NMR, of 75% or greater, and the melt flow rate less than or equal to about 800 g/10 min measured at 230° C. and 2.16 kg weight.

7. The polymer composition of paragraph 5, wherein the propylene-based copolymer comprises, based on the weight of the propylene-based copolymer, (a) at least about 82.5 wt % to 92.5 wt % of propylene-derived units, (b) about 7.5 wt % to 17.5 wt % of units derived from at least one of ethylene or a $C_4$-$C_{10}$ alpha-olefin, and optionally (c) about 0 to 3 wt % of diene-derived units, wherein from about 65% to about 95%, of the propylene residues in the propylene-based copolymer have the same 1,2 insertion and the stereochemical orientation of the pendant methyl groups is the same, as determined by $^{13}$CNMR, and the melt flow rate less than or equal to about 25 g/10 min measured at 230° C. and 2.16 kg weight.

8. The polymer composition of paragraph 1, wherein the olefin-based copolymer is an ethylene/$C_3$-$C_{10}$ alpha-olefin copolymer.

9. The polymer composition of paragraph 1 or 8, wherein the ethylene/$C_3$-$C_{10}$ alpha-olefin copolymer is a copolymer comprising ethylene-derived units and at least one of $C_3$-$C_{10}$ alpha-olefin-derived units having a total crystallinity, as determined by DSC, of from 5 to 20% and a Brookfield viscosity from 3,000 to 20,000 cP measured at 177° C.

10. The polymer composition of paragraph 1 or 8, wherein the ethylene/$C_3$-$C_{10}$ alpha-olefin copolymer is a copolymer of ethylene-derived units and units derived from at least one of propylene, isobutylene, 1-butene, 1-pentene, 1-hexene and 1-octene.

11. The polymer composition of paragraph 1, wherein the olefin-based copolymer is a copolymer of propylene-derived units and ethylene-derived units.

12. The polymer composition of paragraph 1, further comprises a cross-linking pack comprising a cross-linking agent and a coagent, wherein the cross-linking agent is organic peroxide and the coagent is selected from the group consisting of: di- and tri-allyl cyanurates and isocyanurates, liquid and metallic multifunctional acrylates and methacrylates, zinc-based dimethacrylates and diacrylates, functionalized polybutadiene resins, and combinations thereof.

13. The polymer composition of paragraph 12, wherein the cross-linking agent is present in an amount of from 0.1 to 5 parts by weight, and/or the coagent is present in an amount of from 0.05 to 10 parts by weight, based on 100 parts by weight of the olefin-based copolymer.

14. The polymer composition of paragraph 1, further comprises one or more inorganic fillers selected from the group consisting of: carbon black, ferrite magnet powder, calcium carbonate, alumina trihydrate, magnesium hydroxide, titanium dioxide, and combinations thereof.

15. An article comprising the polymer composition of any of paragraphs 1 to 14.

16. A method for making the polymer composition of any of paragraphs 1 to 14, comprising a step of mixing the olefin-based copolymer with the color pigment at a temperature of 60 to 200° C., a rotor speed of 40 to 100 rpm, and a time of 10 to 20 minutes.

17. The method of paragraph 16, wherein the mixing step is a multi-pass mixing step.

EXAMPLES

Materials and Methods

Melt Flow Rate (MFR) is determined by ASTM D 1238 (230° C./2.16 kg).

Melt Index (MI) is determined by ASTM D 1238 (190° C./2.16 kg).

Vistamaxx™ 6202 Polymer, a propylene-based copolymer having an MFR of 20 dg/min and commercially available from ExxonMobil Chemical Company, was used in the examples as an olefin-based copolymer (A).

Vistamaxx™ 6502 Polymer, a propylene-based copolymer having an MFR of 48 dg/min and commercially available from ExxonMobil Chemical Company, was used in the examples as another olefin-based copolymer (B).

ExxonMobil™ LLDPE LL 6201, a linear low density polyethylene with an MI of 50 dg/min and commercially available from ExxonMobil Chemical Company, was used as a comparison example (C).

LDPE 18D is a low density polyethylene, having an MI of 1.5 dg/min commercially available from Da Qing Petro. Chem., China.

Phthalocyanine green and phthalocyanine blue, commercially available from BASF Corporation, were used as representative color pigments.

Example 1: Maximum Color Pigment Loading Test

A representative color pigment phthalocyanine blue was melt blended with Vistamaxx™ 6202 olefin-based copolymer or Vistamaxx™ 6502 olefin-based copolymer through a Haake-Rheocord 90, commercially available from Thermo Scientific Inc. ("HAAKE mixer" hereinafter), to obtain a set of polymer compositions ("masterbatch compounds"). The HAAKE mixer blending was conducted at a temperature of 190° C., a rotation speed of 50 rpm, for a time period of 10 minutes. The contents of phthalocyanine blue were 50, 60, 70 and 80 wt % respectively.

It can be seen from FIG. 1, much more color pigment powder stuck to the masterbatch compounds, when the content of color pigment was increased from 60 to 70 wt %. FIG. 1 demonstrates a good dispersion of color pigment in masterbatch compounds when the content of color pigment is no more than 60 wt %, particularly for the masterbatch compounds including Vistamaxx™ 6502 olefin-based copolymer. It can be concluded the color pigment was over loaded more than 60% and thus 60% was considered as the maximum color pigment loading level.

Figure 2:
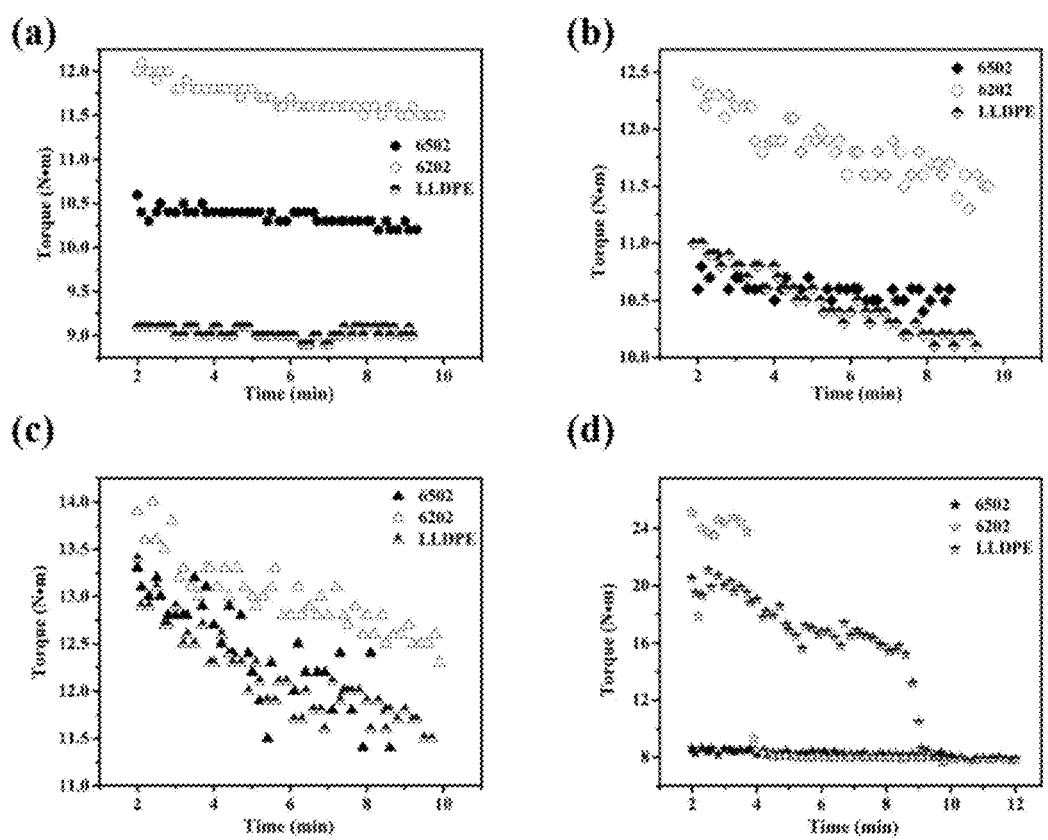
FIG. 2 shows torques of inventive polymer compositions during melt blending from Haake mixer, including the masterbatch compounds of Vistamaxx™ 6202 or Vistamaxx™ 6502 olefin-based copolymers, and comparative polymer compositions of Exact™ 6201 LLDPE, where different color pigment contents in (a) 50 wt %, (b) 60 wt %, (c) 70 wt %, and (d) 80 wt % are present.

The torque of masterbatch compounds were recorded to analyze the status of color pigment dispersion. As shown in FIG. 2, the torque kept almost constant when the color pigment content was increased from 50 wt % to 60 wt % during melt blending of masterbatch compounds including Vistamaxx™ 6502 olefin-based copolymer and the color pigment phthalocyanine blue. This result shows that the color pigments were well dispersed when their content is no more than 60 wt %. While the color pigment content was increased to 70 wt %, the torque increased to 13 N·m at the beginning of melt blending and then decreased gradually with obvious turbulence, indicating the masterbatch compounds including Vistamaxx™ 6502 olefin-based copolymer were over loaded and extra color pigments can't be incorporated in polymer matrix, and thus rotor slipping occurs.

As a comparison, masterbatch compounds including LLDPE has an obvious torque increase when the color pigment content was increased, showing a poor dispersion of color pigments when the content was higher.

Example 2: Processability of the Polymer Compositions

Masterbatch compounds including Vistamaxx™ 6502 olefin-based copolymer or LLDPE and with different color pigment loadings: (a) 50 wt %, (b) 60 wt %, and (c) 70 wt % were prepared according to Example 1. Then the masterbatch compounds were compressed into disks with a diameter of 25 mm and a thickness of 1 mm at 190° C. Viscoelasticity behavior of the masterbatch compounds were monitored by a rotational rheometer (HAAK MARS, Thermo Scientific Inc.) with parallel plate geometry having a diameter of 20 mm. The gap between two plates was 700 m during measurements. Frequency sweep from 100 to 0.1 Hz was measured at 180° C. under nitrogen purge to minimize sample degradation. The strain during frequency sweep was set at 1%.

Figure 3:
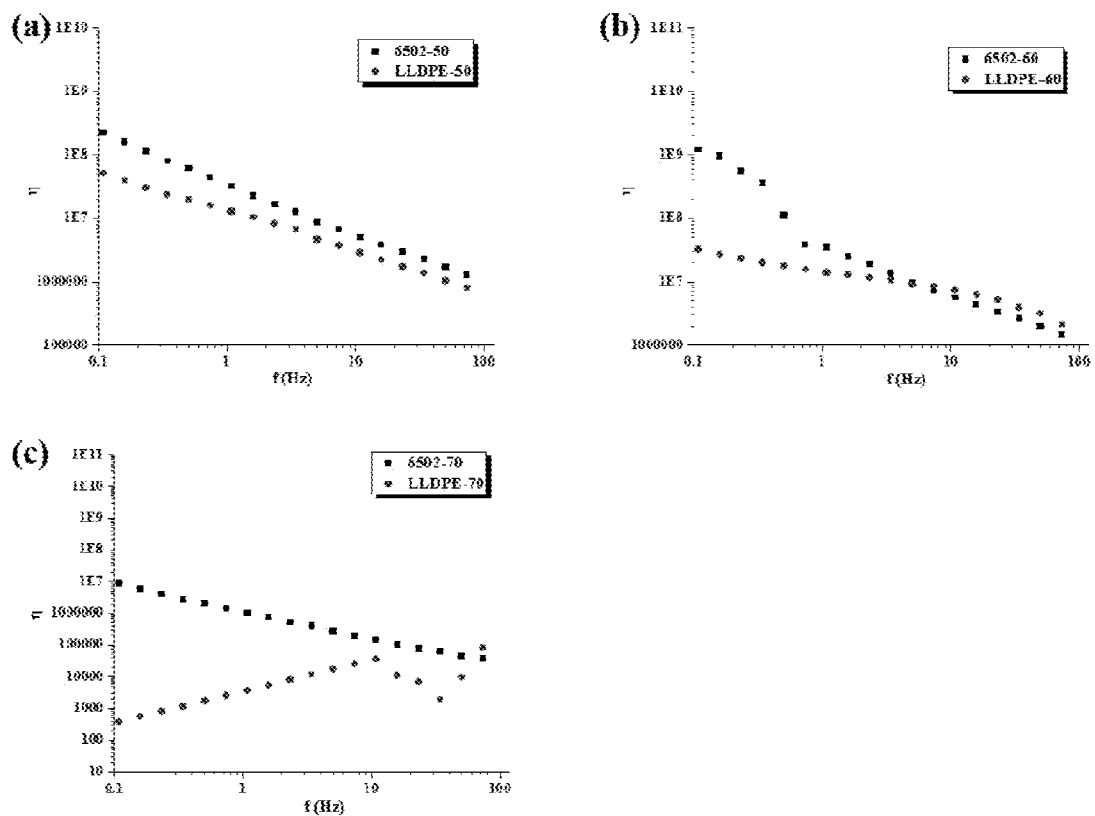
FIG. 3 shows complex viscosities of inventive polymer compositions including Vistamaxx™ 6502 olefin-based copolymer and comparative polymer compositions Exact™ 6201 LLDPE, with different contents of color pigment: (a) 50 wt %, (b) 60 wt %, and (c) 70 wt %.

In FIG. 3, the complex viscosities of masterbatch compounds prepared from Vistamaxx 6502 olefin-based copolymer and LLDPE are compared when keeping the color pigment content is the same. It is clearly shown that complex viscosities of the masterbatch compounds including Vistamaxx™ 6502 olefin-based copolymer is higher than that of the masterbatch compounds including LLDPE irrespective of color pigments content from 50 to 70 wt %. With increasing of color pigment content, shear thinning of Vistamaxx™ 6502 olefin-based copolymer is more sensitive than that of LLDPE, as shown in FIGS. 3A and 3B. It is noticed in FIG. 3C that, at higher loading for LLDPE, shear-thickening happens, which is unfavorable for color pigment dispersion.

Example 3: Evaluation of Specks Number in LDPE Blown Films

Figure 4:
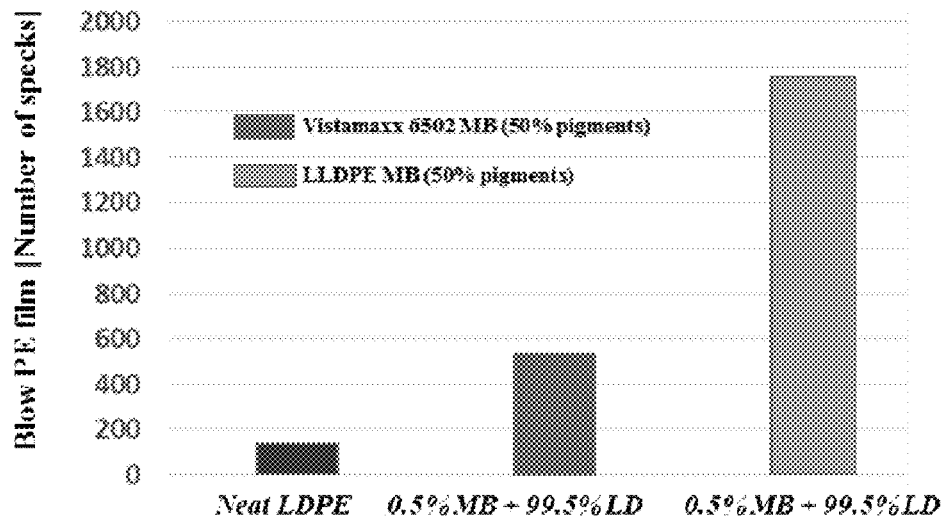
FIG. 4 shows specks numbers in LDPE blown films including polymer compositions of Vistamaxx™ 6502 olefin-based copolymer and comparative polymer compositions Exact™ 6201 LLDPE and 50 wt % of color pigment.
Figure 5:
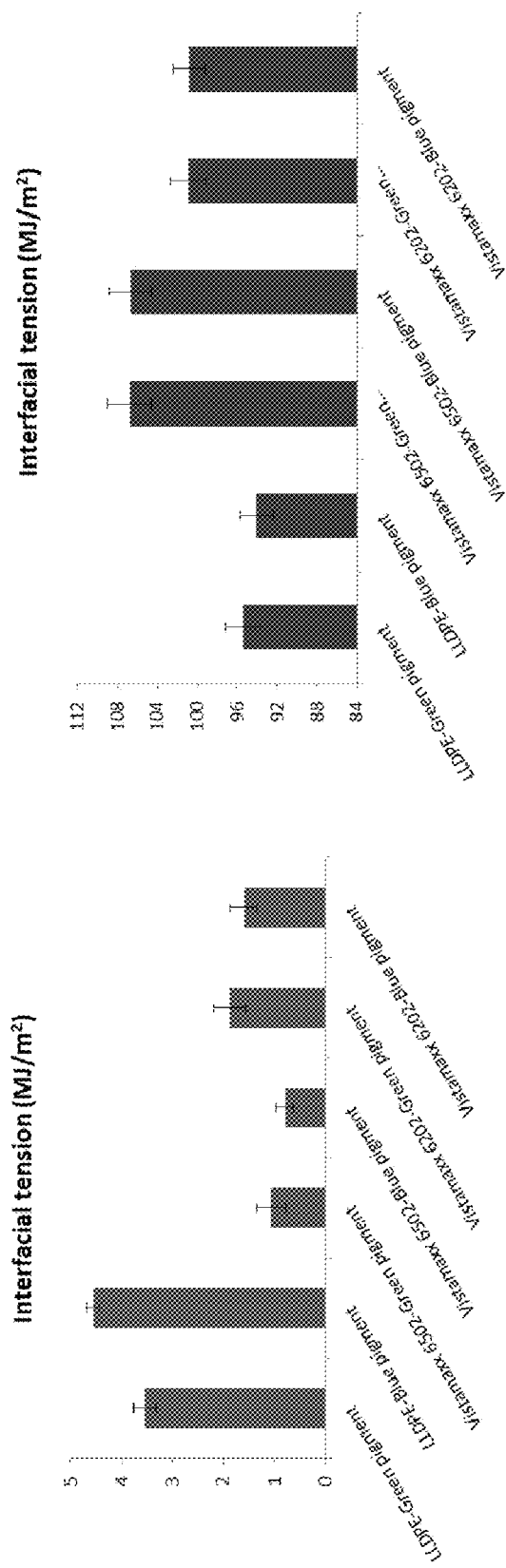
FIG. 5 shows interfacial tension and the work of adhesion between different polymers and color pigments.

To better test color pigment dispersion, we analyzed the specks number in LDPE blown film using the masterbatch compounds including Vistamaxx™ 6502 olefin-based copolymer or LLDPE with 50 wt % color pigment. Formulation of the blown films was 0.5 wt % masterbatch compounds and 99.5 wt % LDPE. The specks number in LDPE blown films was analyzed using Image J under microscopy. The data shown in FIG. 4 showed number of specks was significantly reduced when masterbatch compounds including Vistamaxx™ 6502 olefin-based copolymer were used, indicating Vistamaxx™ 6502 olefin-based copolymer can make color pigment better dispersed in end products Example 4: Adhesion Force Between Olefin-Based Copolymers and Color Pigments Representative olefin-based copolymers or LLDPE were compressed into thin films at a temperature of below 190° C. FIG. 5 shows adhesion force of olefin-based copolymer or LLDPE, with color pigments (phthalocyanine green and phthalocyanine blue). It shows that olefin-based copolymers, especially Vistamaxx™ 6502 olefin-based copolymer, has much higher adhesion force towards phthalocyanine green and phthalocyanine blue. This strong adhesion force would allow olefin-based copolymers showing a higher color pigment loading and better dispersion.

Example 5: Wetting Behavior of the Polymer Compositions

Figure 6:
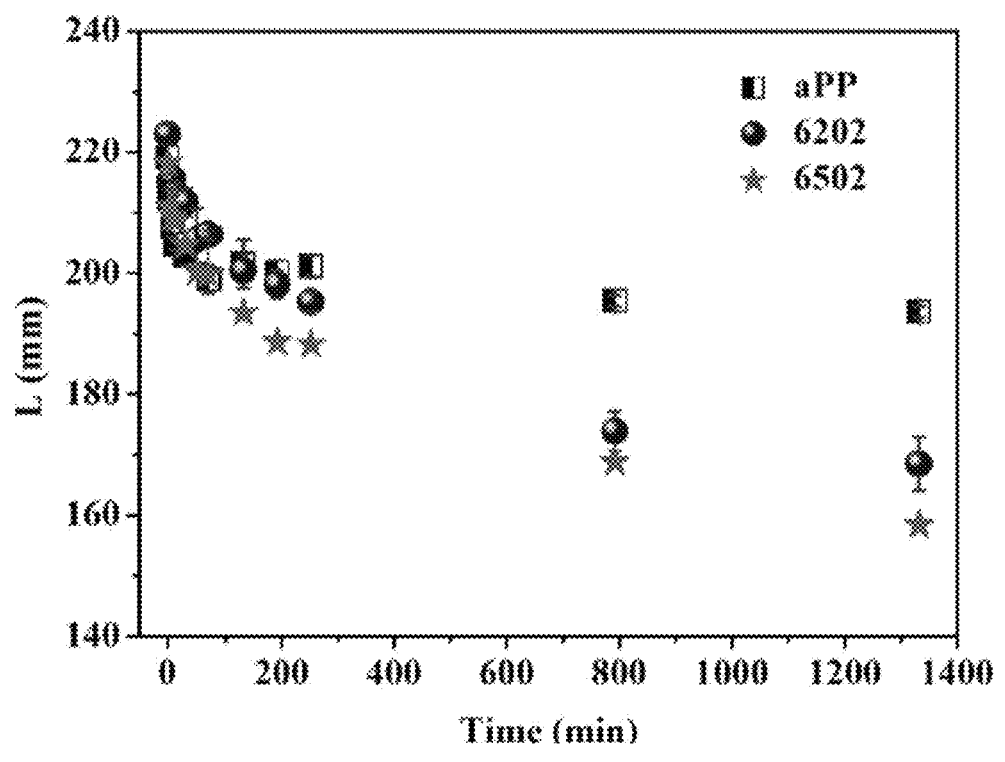
FIG. 6 demonstrates wetting behavior of the inventive polymer compositions and the comparative polymer composition.

Wetting behavior of different polymers towards color pigment phthalocyanine green was shown in FIG. 6. The results showed that Vistamaxx™ 6502 and Vistamaxx™ 6202 olefin-based copolymers have a better wetting ability than that of polypropylene.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A polymer composition comprising:
a propylene-based copolymer comprising, based on the total weight of the propylene-based copolymer, (a) at least about 60 wt % of propylene-derived units, (b) about 5 wt % to about 35 wt % of units derived from at least one of ethylene or a $C_4$-$C_{10}$ alpha-olefin, and optionally (c) about 0 to 5 wt % of diene-derived units, wherein the propylene-based copolymer has a heat of fusion, as determined by DSC, of about 75 J/g or less, a melting point, as determined by DSC, of about 100° C. or less, and a crystallinity, as determined by DSC, of about 2% to about 65%, and a melt flow rate from 0.5 to 1,000 g/10 min measured at 230° C. and 2.16 kg weight; and
a color pigment comprising at least one phthalocyanine compound having the following formula or halide derivatives thereof:

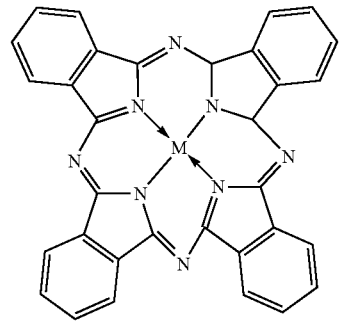

wherein M is a metal selected from the group consisting of copper, nickel, cobalt, chromium, iron, manganese, cadmium and combinations thereof; and
wherein the color pigment is present in an amount of 35 wt % to 60 wt %, based on the total weight of the polymer composition.

2. The polymer composition of claim 1, wherein the propylene-based copolymer comprises, based on the weight of the propylene-based copolymer, (a) about 75 wt % to 95 wt % of propylene-derived units, (b) about 5 wt % to 25 wt % of units derived from at least one of ethylene or a $C_4$-$C_{10}$ alpha-olefin, and optionally (c) about 0 to 4 wt % of diene-derived units, wherein the propylene-based copolymer has an mm triad tacticity index, as determined by $^{13}$C NMR, of 75% or greater, and the melt flow rate is from 0.5 to about 800 g/10 min measured at 230° C. and 2.16 kg weight.

3. The polymer composition of claim 1, wherein the propylene-based copolymer comprises, based on the weight of the propylene-based copolymer, (a) about 82.5 wt % to 92.5 wt % of propylene-derived units, (b) about 7.5 wt % to 17.5 wt % of units derived from at least one of ethylene or a $C_4$-$C_{10}$ alpha-olefin, and optionally (c) about 0 to 3 wt % of diene-derived units, wherein from about 65% to about 95%, of the propylene residues in the propylene-based copolymer have the same 1,2 insertion and the stereochemical orientation of the pendant methyl groups is the same, as determined by $^{13}$CNMR, and the melt flow rate is from 0.5 to about 25 g/10 min measured at 230° C. and 2.16 kg weight.

4. The polymer composition of claim 1, wherein the color pigment is present in an amount of from 40 wt % to 60 wt %, based on the total weight of the polymer composition.

5. The polymer composition of claim 1, wherein the color pigment is present in an amount of 50 wt % to 60 wt %, based on the total weight of the polymer composition.

6. An article comprising the polymer composition of claim 1.

7. A polymer composition consisting of:
a propylene-based copolymer, based on the total weight of the propylene-based copolymer, of (a) at least about 60 wt % of propylene-derived units, (b) about 5 wt % to about 35 wt % of units derived from at least one of ethylene or a $C_4$-$C_{10}$ alpha-olefin, wherein the propylene-based copolymer has a heat of fusion, as determined by DSC, of about 75 J/g or less, a melting point, as determined by DSC, of about 100° C. or less, and a crystallinity, as determined by DSC, of about 2% to about 65%, and a melt flow rate from 0.5 to 1,000 g/10 min measured at 230° C. and 2.16 kg weight; and
at least one phthalocyanine compound having the following formula or halide derivatives thereof:

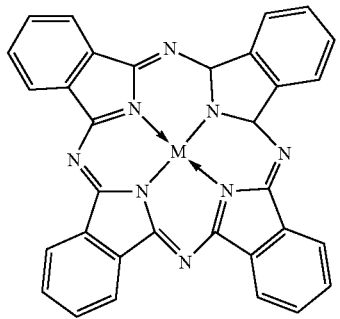

wherein M is a metal selected from the group consisting of copper, nickel, cobalt, chromium, iron, manganese, cadmium and combinations thereof; and wherein the color pigment is present in an amount of 35 wt % to 60 wt %, based on the total weight of the polymer composition.

8. The polymer composition of claim 7, wherein the propylene-based copolymer, based on the weight of the propylene-based copolymer, has (a) about 75 wt % to 95 wt % of propylene-derived units, and (b) about 5 wt % to 25 wt % of units derived from at least one of ethylene or a $C_4$-$C_{10}$ alpha-olefin, wherein the propylene-based copolymer has an mm triad tacticity index, as determined by $^{13}$C NMR, of 75% or greater, and the melt flow rate is from 0.5 to about 800 g/10 min measured at 230° C. and 2.16 kg weight.

9. The polymer composition of claim 7, wherein the propylene-based copolymer, based on the weight of the propylene-based copolymer, has (a) about 82.5 wt % to 92.5 wt % of propylene-derived units, (b) about 7.5 wt % to 17.5 wt % of units derived from at least one of ethylene or a $C_4$-$C_{10}$ alpha-olefin, wherein from about 65% to about 95%, of the propylene residues in the propylene-based copolymer have the same 1,2 insertion and the stereochemical orientation of the pendant methyl groups is the same, as determined by $^{13}$CNMR, and the melt flow rate is from 0.5 to about 25 g/10 min measured at 230° C. and 2.16 kg weight.

10. The polymer composition of claim 7, wherein the color pigment is present in an amount of from 40 wt % to 60 wt %, based on the total weight of the polymer composition.

11. The polymer composition of claim 7, wherein the color pigment is present in an amount of 50 wt % to 60 wt %, based on the total weight of the polymer composition.

12. An article comprising the polymer composition of claim 7.

* * * * *